United States Patent
Ercan et al.

(10) Patent No.: US 9,409,493 B2
(45) Date of Patent: Aug. 9, 2016

(54) METHOD FOR CONTROLLING AN ELECTRIC MACHINE RESTRICTING ENERGY LOSSES

(71) Applicant: RENAULT s.a.s., Boulogne-Billancourt (FR)

(72) Inventors: Ali Ercan, Guyancourt (FR); Anh-Linh Bui-Van, Saint Nizier Du Moucherotte (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/425,231

(22) PCT Filed: Jul. 25, 2013

(86) PCT No.: PCT/FR2013/051798
§ 371 (c)(1),
(2) Date: Mar. 2, 2015

(87) PCT Pub. No.: WO2014/033381
PCT Pub. Date: Mar. 6, 2014

(65) Prior Publication Data
US 2015/0217658 A1 Aug. 6, 2015

(30) Foreign Application Priority Data
Aug. 29, 2012 (FR) .................................. 12 58083

(51) Int. Cl.
*H02P 1/00* (2006.01)
*B60L 11/18* (2006.01)
*B60W 30/188* (2012.01)

(52) U.S. Cl.
CPC ........... *B60L 11/1864* (2013.01); *B60L 11/187* (2013.01); *B60L 11/1855* (2013.01);
(Continued)

(58) Field of Classification Search
CPC ............ B60L 11/1859; B60L 11/1861; B60L 11/1864; B60L 11/1868; B60L 11/187; B60L 15/2045; B60L 2240/547; B60L 2240/527; B60W 30/188
USPC ......... 318/139, 162, 438, 440, 442, 478, 479, 318/504; 180/65.1, 65.21, 65.29, 65.31
See application file for complete search history.

(56) References Cited

U.S. PATENT DOCUMENTS

| 6,140,799 A | 10/2000 | Thomasson |
| 7,200,476 B2 * | 4/2007 | Cawthorne ............. B60K 6/445 |
| | | 180/65.265 |

(Continued)

FOREIGN PATENT DOCUMENTS

JP 2008-109749 5/2008

OTHER PUBLICATIONS

International Search Report Issued Jan. 29, 2014 in PCT/FR13/051798 Filed Jul. 25, 2013.

(Continued)

*Primary Examiner* — Bentsu Ro
*Assistant Examiner* — Thai Dinh
(74) *Attorney, Agent, or Firm* — Oblon, McClelland, Maier & Neustadt, L.L.P.

(57) ABSTRACT

A method for controlling an electric machine in a hybrid or electric motor vehicle fed by a battery by power electronics, the battery including an assembly of modules interconnected in series and the method realizes a module-commutation in which each module can be selectively disconnected from the assembly. The method includes: calculating energy losses as a function of current operating characteristics of the electric machine, or respectively for each of a plurality of possible module-commutation configurations; determining at least one optimum module-commutation configuration from the plurality of possible module-commutation configurations, reducing energy losses to a minimum; and commutating the modules according to the previously determined optimum commutation configuration.

8 Claims, 1 Drawing Sheet

(52) U.S. Cl.
CPC ........ *B60L11/1872* (2013.01); *B60W 30/188* (2013.01); *B60L 2240/36* (2013.01); *B60L 2240/461* (2013.01); *B60L 2240/463* (2013.01); *B60L 2240/525* (2013.01); *B60L 2240/545* (2013.01); *B60L 2240/547* (2013.01); *Y02T 10/7005* (2013.01); *Y02T 10/7061* (2013.01); *Y02T 10/92* (2013.01)

(56) References Cited

U.S. PATENT DOCUMENTS

| | | | |
|---|---|---|---|
| 7,208,894 B1 | 4/2007 | Earle | |
| 7,607,503 B1* | 10/2009 | Schechter | B60K 6/12 123/255 |
| 7,701,156 B2* | 4/2010 | Okamura | B60K 6/365 180/65.265 |
| 9,050,969 B2* | 6/2015 | Yu | B60W 10/06 |
| 2006/0164034 A1 | 7/2006 | Hanyu et al. | |
| 2011/0006723 A1 | 1/2011 | Yamakawa et al. | |
| 2012/0059565 A1* | 3/2012 | Kozarekar | B60K 6/445 701/99 |

OTHER PUBLICATIONS

French Search Report Issued Mar. 6, 2013 in French Patent Application No. 1258083 Filed Aug. 29, 2012.

\* cited by examiner

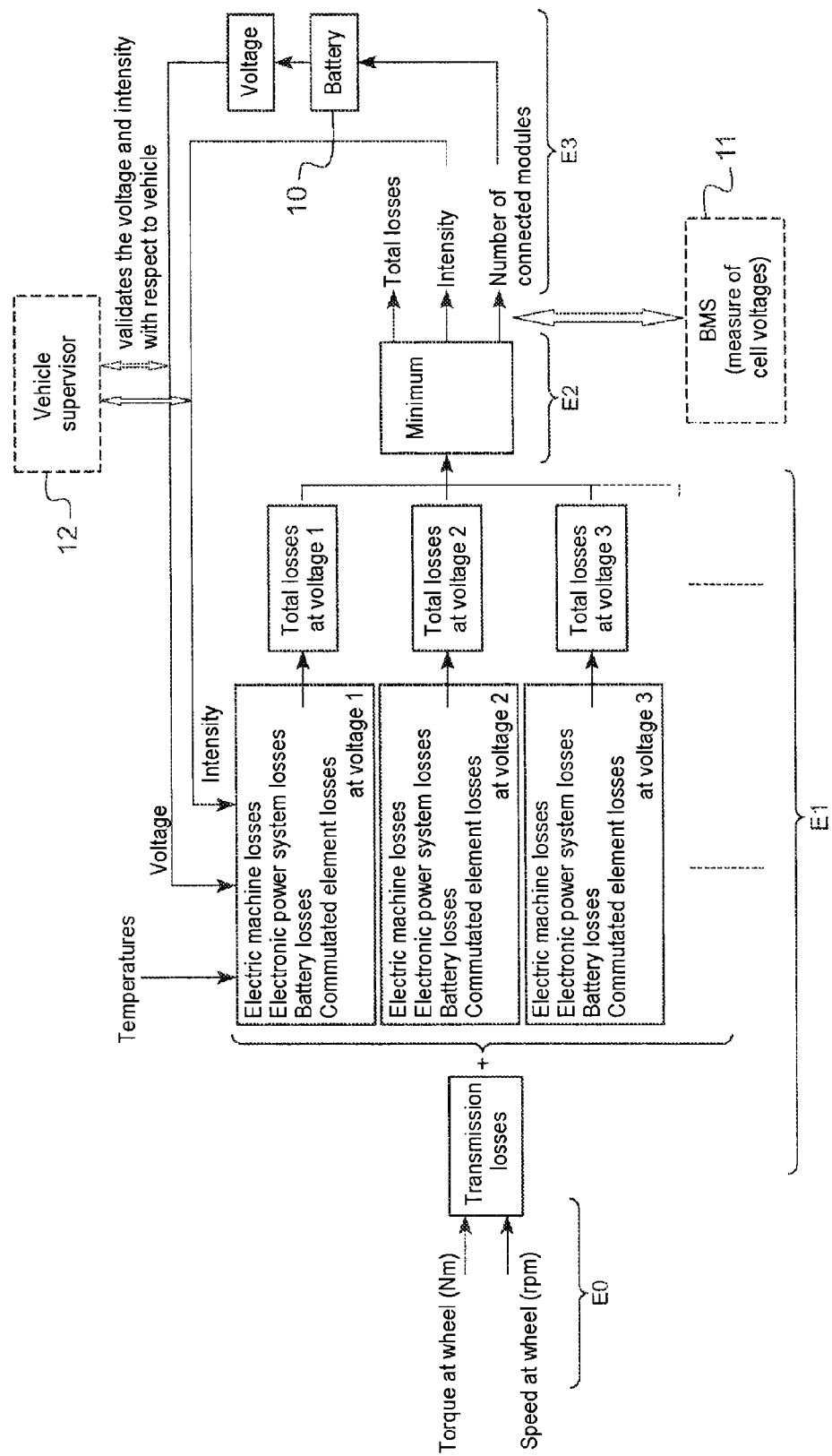

METHOD FOR CONTROLLING AN ELECTRIC MACHINE RESTRICTING ENERGY LOSSES

The present invention relates to controlling a traction and/or propulsion chain which comprises an electric drive machine of a motor vehicle, in particular an electric or hybrid vehicle, the electric machine being supplied with electric power by means of a battery of electric accumulators, or cells, which are distributed over a plurality of elementary units which are called modules and which are electrically connected to each other. More specifically, it relates to a method for controlling such an electric machine in which the battery is of the type having a commutated architecture, where each module in particular may be selectively disconnected electrically from the set of modules of the battery.

Such an architecture is well known to the person skilled in the art in particular from the examples given in the patent document US 2012/0091963, which illustrate in particular module disconnection systems which allow a module which is defective or potentially defective to be disconnected from the set of modules to which it is electrically coupled. These cell or module disconnection systems which are integrated in the battery may also be used to implement balancing strategies between modules of the battery.

In this context, a field of application envisaged by the present invention is in particular control of energy losses from the electric machine in order to optimize the energy balance of the vehicle.

The patent application WO 2008/093687 discloses a method for limiting the energy losses in the electric machine in order to increase travel independence. This method is based on mapping which provides loss values in accordance with the torque and the speed of rotation of the electric machine. In this manner, at constant voltage, the operating points of the electric machine are confined within a range involving good yield therefrom.

Normally, the battery output voltage is imposed by the battery and the state of charge thereof. In most cases, this battery output voltage is then applied directly to the input of the electronic power system of the electric machine, whose function is to convert the voltage at the battery in order to control and supply electric power to the electric machine. This conversion results in losses in the electronic power system, in particular losses resulting from conduction and losses resulting from commutation, and the losses resulting from commutation are directly linked to the level of the voltage to be chopped at the input, that is to say to the battery output voltage. Therefore, when the battery output voltage is applied directly to the input of the electronic power system of the electric machine, the conversion is carried out completely by the electronic power system, with the resultant losses owing to commutation.

However, the document WO 2009/116215 discloses a device which allows the voltage applied to the input of the electric machine to be varied as a result of the presence of a voltage converter ("boost converter") which is arranged between the output of the battery and the input of the electronic power system of the electric machine. Such an architecture in particular allows the currents at the motor to be reduced and therefore the motor to be resized in an advantageous manner in order to optimize the overall energy balance. However, the presence of a converter at the output of the battery has an unfavorable impact in particular in terms of cost and bulk, since it constitutes an additional system to be integrated.

An aim of the invention is to provide a method for controlling a traction and/or propulsion chain which is constituted particularly and not exclusively by an electric machine, by the electronic system thereof, by a transmission and by a braking system and which can be combined with the strategies linked to batteries having a commutated architecture, whilst allowing the energy balance of the vehicle to be optimized, without the limitations set out above.

To this end, the present invention proposes a method for controlling a traction and/or propulsion chain which comprises an electric machine for driving an electric or hybrid motor vehicle which is supplied with electric power by a battery via a control circuit which is associated with an electronic power circuit, the battery having a set of modules each having at least one electric accumulator, the modules being connected in series with each other, the method comprising a step of commutation of the modules in which each module of the set may be selectively disconnected from the set. According to the invention, the method comprises the following steps: a step of calculating the energy losses in accordance with common operating characteristics of the traction and/or propulsion chain, for each of a plurality of possible commutation configurations of the modules, respectively; a step of determining at least one optimum commutation configuration of the modules which minimizes the energy losses from the plurality of possible commutation configurations; and a step of activating the commutation step of the modules in accordance with the optimum commutation configuration of the modules which minimizes the energy losses.

In this manner, the control strategy of the invention involves the use of the commutation system of the modules of the battery in order to modify the number of modules connected in series in the set of modules which constitutes the battery, with the advantageous aim of being able to modify the voltage at the battery output which is applied to the input of the electronic power circuit and, in particular, in order to be able to apply a voltage which is capable of minimizing the energy losses, without it being necessary to integrate an additional system, such as, for example, the converter used in the solution set out in the document WO 2009/116215. In particular, for given operating characteristics of the electric machine, it is possible to thus modify the voltage at the output of the battery downwards, which advantageously allows the overall energy yield of the vehicle to be increased. Therefore, in contrast to the current solutions for minimizing energy losses, where the voltage applied to the input of the electronic power system is imposed by the battery and its state of charge, the invention advantageously affords an additional degree of freedom in order to act on the overall energy yield of the vehicle, by offering the possibility of reducing the level of voltage at the output of the battery relative to the maximum voltage of the battery and thus of reducing the losses by commutation at the electronic power system of the electric machine, which are directly linked to this voltage level.

According to an advantageous embodiment, the common operating conditions are established based on a command which is applied to the electric machine and which represents a torque instruction that the electric machine has to carry out.

Preferably, the torque instruction command is generated in accordance with the position of an accelerator control member, in particular a pedal.

Furthermore, the common operating conditions may comprise the torque which is provided by the electric machine and which is determined in accordance with the torque instruction command.

Preferably, the common operating conditions include the speed of the electric machine.

According to an advantageous embodiment, the step of calculating the energy losses for each of the plurality of possible commutation configurations of the modules is based on mapping which provides, for each of the configurations, the value of the energy losses in the electric machine and in the electronic power circuit in accordance with specific operating conditions and in accordance with voltage values at the output of the battery.

Simple functions may also be associated with this mapping in order, for example, to interpolate the different mapping for other voltages, or even to better take into account the temperature in the calculation of the losses.

Preferably, the step of determining the optimum commutation configuration comprises the following sub-steps if a plurality of commutation configurations of the modules minimize the losses in substantially equal proportions: a sub-step of estimating the battery temperature brought about by each of the commutation configurations of the modules which minimize the losses; and a sub-step of determining the configuration which minimizes the battery temperature; whilst the step of activating the commutation step of the modules is carried out in accordance with the optimum commutation configuration of the modules which minimizes the losses and the battery temperature.

Advantageously, the step of determining the optimum commutation configuration of the modules further comprises a step of selecting the module(s) to be preferentially disconnected, the selection being based on a respective state of charge and/or heating level of the modules.

Other features and advantages of the invention will be appreciated from a reading of the following description of a specific embodiment of the invention, given by way of non-limiting example, with reference to the appended FIG. 1, which is a flow chart of the method in accordance with the invention.

The drive system of the motor vehicle, which may be, for example, electric or hybrid, comprises an electric machine (not illustrated). The supply of current for the electric machine is provided by means of an electrical energy storage battery 10 which is connected to the electric machine via an electronic power circuit (not illustrated), which comprises a converter and cabling between the battery and the converter. The battery 10, which is commonly called a high-voltage battery, comprises n modules which are each constituted by at least one electric accumulator cell which may be modeled in a simplified manner by series connection of a DC voltage generator and an internal resistor, the different modules of the battery being connected in series.

The battery 10 is conventionally controlled by an electronic processor 11, called BMS ("Battery Monitoring System"), which allows all of the parameters of each cell to be controlled in accordance with measurements taken by current, voltage, temperature sensors, etcetera.

Furthermore, the battery is provided with means which are used to implement balancing strategies between modules of the battery. These means in particular allow individual parallel-connected diversion branches of each module which is interconnected in series to be placed in a circuit in order to be able, where applicable, to selectively disconnect (or "by-pass") a module from the set of modules which constitute the battery for the purposes of balancing the battery. To this end, each module of the battery is connected to the set of modules of the battery via commutation members, which are series and parallel, respectively, and the battery is provided with a commutation system for the modules which is intended to control the commutation members, in accordance with a required balancing strategy. In this manner, in this commutated architecture, each module of the battery may be selectively connected or disconnected ("by-passed") from the set of modules constituting the battery by means of appropriate control of the commutation members of the modules.

An electronic control processor 12, of supervisor type, receives information from the different members of the vehicle and in particular from the high-voltage battery 10. This main supervisor 12 is capable of controlling requests and constraints originating from the different systems which are connected to the high-voltage network of the vehicle and communicates in particular with the electronic power system, which controls the electric machine, this control being carried out in particular in accordance with parameters which are fixed by the driver, such as depression of the accelerator pedal of the vehicle.

The control strategy of the invention is implemented based on an algorithm, which may be internal with respect to the main supervisor 12, or internal with respect to the BMS processor 11 but which must in this instance communicate with the main supervisor 12. This algorithm takes into account, in a step E0, common operating characteristics of the traction and/or propulsion chain, which are established from the command applied to the electric machine, which originates, for example, from the depression of the accelerator pedal, whose position translates a torque instruction to be applied to the wheels of the vehicle so that the speed of movement thereof corresponds to the speed required by the driver. In step E0, the input of the algorithm also receives an item of information relating to the speed of the electric machine.

For a given operating configuration which corresponds to the torque/machine speed operating point established in step E0, the control strategy of the invention involves modifying the commutation configuration of the modules of the battery, that is to say the number of modules which are interconnected in series, by selectively disconnecting a specific number of modules of the battery in order to modify the voltage at the output of the battery, with the aim of increasing the overall energy yield of the vehicle.

More specifically, the commutation system for the modules of the battery allows a specific number of modules to be "by-passed", defining as many possible commutation configurations of the modules of the battery from the following cases, optionally:

Case 0: no module by-passed;
Case 1: 1 module by-passed;
Case 2: 2 modules by-passed; etcetera.

However, a maximum number of modules which can be disconnected from the high-voltage battery 10 will be fixed since there is an acceptable low-voltage limit with regard to the design of the vehicle, below which it is not permissible to fall, without which the on-board systems connected to the high-voltage network of the vehicle could no longer function.

As soon as the commutation configuration of the modules of the battery, that is to say the number of by-passed modules, and the voltage supplied by the modules, via the BMS processor which measures the voltages of each cell, are known, it is possible to know, for each of the cases identified above, the voltage provided at the output of the high-voltage battery 10.

In this manner, in a step E1, for a specific torque/machine speed operating point, the algorithm is configured to initially work out the balance of the total energy losses for the different cases (case 0, case 1, etcetera) identified above, each corresponding to a possible commutation configuration of the modules of the battery and therefore to a specific voltage at the output of the battery, at voltage 1, voltage 2, voltage 3, etcetera, respectively.

In particular, the losses taken into account in step E1 for the estimation of the energy losses brought about for each possible commutation configuration of the modules of the battery, respectively, comprise the losses linked to the transmission, which are a function principally of the machine speed and which are independent of the voltage at the output of the battery.

The losses taken into account in step E1 also comprise the losses in the electric machine and in the electronic power circuit, which are a function of the temperature of these members, the torque and the speed of the electric machine and the voltage provided by the battery. The calculation of these losses may be based on mapping of values of energy losses in the electric machine and the electronic power circuit in accordance with the torque and the machine speed and in accordance with the value of voltage supplied by the battery, at different voltages corresponding to the different possible commutation configurations of the modules of the battery.

The energy losses taken into account in step E1 further comprise the internal losses linked to the battery itself, outside the commutation system of the modules, which are a function of the internal resistance of the cells which constitute the modules of the battery, these internal resistances themselves being a function of the temperature of the cells, the resistances of the connectors and the number of modules by-passed.

The energy losses taken into account in step E1 finally comprise the losses linked to the commutation system of the modules of the battery, which are principally a function of the battery current, taking into account that these losses are losses resulting from conduction, the losses resulting from commutation of the commutation members being largely negligible. In this regard, the losses resulting from conduction are practically identical whether or not the module is by-passed, in so far as, in one case, the battery current passes through a commutation member which is in series with the module and, in the other case, a commutation member in parallel, generally identical to the series commutation member. Finally, in step E1, the algorithm enables the overall energy losses to be calculated for a specific torque/machine speed operating point, in each of the possible commutation configurations of the modules, that is to say the total losses at voltage 1, the total losses at voltage 2, the total losses at voltage 3, etcetera, respectively.

It should be noted that the battery current results from the machine speed, the torque, the voltage and the losses. For a specific torque/machine speed point, if one or more modules are by-passed, bringing about a reduction in the voltage at the battery output, the battery current increases. Therefore, as an input parameter for calculation of the losses, the intensity of the battery current will also be taken into account.

Once the total losses have been estimated in step E1 for a specific torque/machine speed operating point, in each of the possible commutation configurations of the modules, the algorithm is designed to determine in a step E2 the optimum commutation configuration of the modules which minimizes the energy losses, from the plurality of possible commutation configurations of the modules.

In the case in which a plurality of commutation configurations of the modules minimize the energy losses in substantially equal proportions, the step E2 of determining the optimum commutation configuration will further take into account the heating of the battery brought about by each commutation configuration of the modules that is identified as allowing the losses to be minimized, in order to determine the optimum commutation configuration. In particular, in this situation, the algorithm is designed to estimate the battery temperature brought about by each of the commutation configurations of the modules which minimize the losses and to determine the configuration which minimizes the battery temperature, which will be retained as being the optimum commutation configuration of the modules which allows the losses and the temperature to be minimized.

In this manner, the algorithm is capable of determining the optimum commutation configuration of the modules which is capable of minimizing the overall energy losses and, where applicable, the battery temperature and which consequently enables determination of the resulting voltage at the battery output which it is advantageous to apply to the input of the electronic power system in order to optimize the energy balance of the vehicle for a specific torque/machine speed operating point at the input.

In this manner, in a step E3, the algorithm is designed to activate the optimum commutation configuration of the modules, by modifying the number of connected modules of the set of interconnected modules of the battery in accordance with this optimum commutation configuration which has previously been determined. To this end, the algorithm is designed to generate a commutation order which specifies the module(s) to be by-passed in order to achieve the optimum commutation configuration of the modules and to transmit the order to the commutation system of the modules which is intended to commutate the modules in accordance with the order so as to modify the battery output voltage, with the aim of optimizing the energy losses. In order to arrive at the optimum configuration, the commutation system of the modules will be able to be prompted to integrate necessary commutation sub-steps. For example, if a plurality of modules have to be by-passed, the commutation system will be able to by-pass them successively in an order to be determined, and not simultaneously, so as to simplify and safeguard the commutation.

The step E2 of determining the optimum commutation configuration may also involve a step of selecting the module(s) to be bypassed in a preferential manner from the different modules of the battery. This choice of the module(s) to be preferentially by-passed will be able to be made on the basis of a respective state of charge and/or heating level of the modules of the battery. In this manner, if the different modules of the battery have very different states of charge, the choice made may be to preferentially by-pass the modules which are the least charged. Also, if the different modules of the battery have very different heating levels, the choice made may be to preferentially by-pass the modules which have the most significant heating levels. In these instances, the commutation order will also have to contain, in addition to the number of modules to be by-passed, an item of identification information, for example a number, associated with the module(s) to be preferentially by-passed.

It will advantageously be possible to make provision for the activation of the commutation of the modules in accordance with the determined optimum commutation configuration to be subjected to a prior validation process of the supervisor vehicle 12, in which the supervisor 12 will or will not validate the possibility of modifying the battery output voltage as imposed by the optimum commutation configuration of the modules. This is because the supervisor controls the priorities and limitations arising from the different producer/consumer systems linked to the high-voltage network of the vehicle. Therefore, by way of example, the choice made may be to give priority to a control mode of the battery which implements the commutation system of the modules for the purposes of balancing the battery, in a manner known per se, rather than for the purposes of optimizing the energy balance of the vehicle, as proposed by the present invention. Thus, the optimum commutation configuration required is not activated.

Furthermore, if the torque/machine speed point established in step E0 corresponds to a high power level, the algorithm will select by default the commutation configuration corresponding to case 0 identified above, in which no module of the set of interconnected modules is by-passed, to the extent that, in accordance with those operating characteristics of the electric machine, the maximum voltage is required at the output of the battery in order to be able to achieve the high power level required.

Finally, in conventional manner, the algorithm may include hystereses in order not to commutate the modules at an excessively high frequency.

The invention claimed is:

1. A method for controlling a traction and/or propulsion chain which includes an electric machine for driving an electric or hybrid motor vehicle which is supplied with electric power by a battery via a control circuit which is associated with an electronic power circuit, the battery having a set of modules each having at least one electric accumulator, the modules being connected in series with each other, the method comprising:
    commutation of the modules in which each module of the set may be selectively disconnected from the set;
    calculating energy losses in accordance with common operating characteristics of the traction and/or propulsion chain, for each of a plurality of possible commutation configurations of the modules, respectively;
    determining at least one optimum commutation configuration of the modules which minimizes the energy losses from the plurality of possible commutation configurations of the modules; and
    activating the commutation of the modules in accordance with the optimum commutation configuration of the modules which minimizes the energy losses.

2. The method as claimed in claim 1, wherein the common operating characteristics are established based on a command which is applied to the electric machine and which represents a torque instruction that the electric machine has to carry out.

3. The method as claimed in claim 2, wherein the torque instruction command is generated in accordance with a position of an accelerator control member, or a pedal.

4. The method as claimed in claim 2, wherein the common operating characteristics comprise the torque which is provided by the electric machine and which is determined in accordance with the torque instruction command.

5. The method as claimed in claim 4, wherein the common operating characteristics include a speed of the electric machine.

6. The method as claimed in claim 1, wherein the calculating the energy losses for each of the plurality of possible commutation configurations of the modules is based on mapping which provides, for each of the configurations, a value of the energy losses in the electric machine and in the electronic power circuit in accordance with specific operating conditions and in accordance with voltage values at an output of the battery.

7. The method as claimed in claim 1, wherein the determining the optimum commutation configuration of the modules comprises the following if a plurality of commutation configurations of the modules minimize the losses in substantially equal proportions:
    estimating a battery temperature brought about by each of the commutation configurations of the modules which minimize the energy losses;
    determining a configuration which minimizes the battery temperature;
    the activating the commutation of the modules being carried out in accordance with the optimum commutation configuration of the modules which minimizes the energy losses and the battery temperature.

8. The method as claimed in claim 1, wherein the determining the optimum commutation configuration of the modules further comprises selecting the module(s) to be preferentially disconnected based on a respective state of charge and/or heating level of the modules.

* * * * *